Aug. 14, 1928.
C. I. FRANTZ
1,680,533
AIR BRAKE APPARATUS
Filed July 11, 1927    3 Sheets-Sheet 2
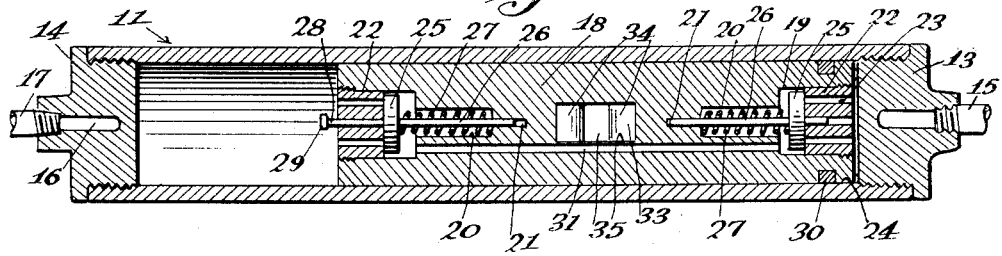

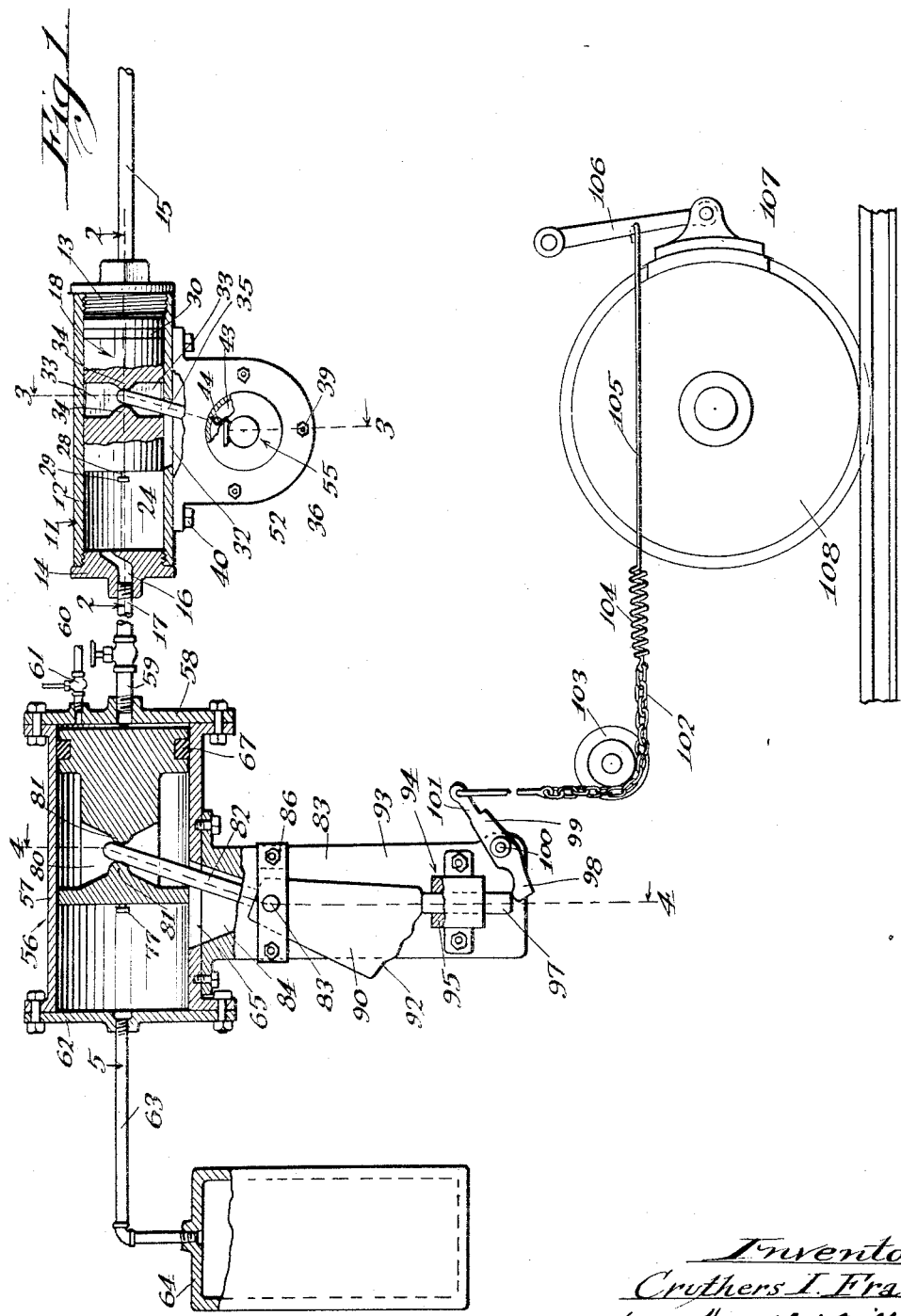

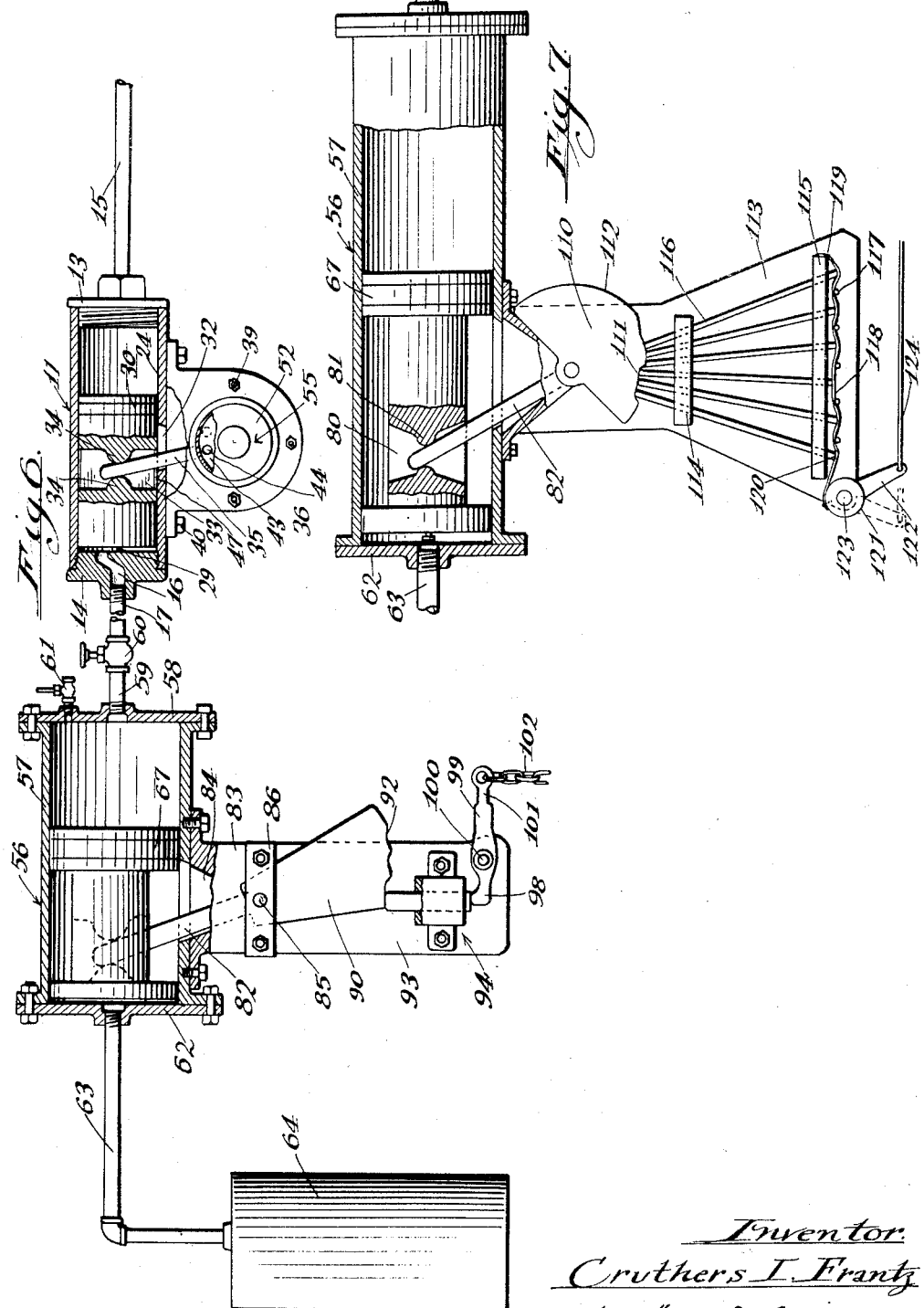

Patented Aug. 14, 1928.

1,680,533

UNITED STATES PATENT OFFICE.

CRUTHERS I. FRANTZ, OF LOS ANGELES, CALIFORNIA.

AIR-BRAKE APPARATUS.

Application filed July 11, 1927. Serial No. 204,895.

My invention is an air brake apparatus suitable for railway or other equipment using air brakes, in which air pressure is utilized to apply the brakes on a decrease of pressure such as a release to the atmosphere, or the like.

An object of my invention is an apparatus for positively applying the brakes, this being actuated by air power, but so constructed that after application of the brakes any leakage of air cannot let the brakes off; but the brakes once set, or partly set, will continue in this action until a positive release is made, this being independent of any leakage there may be in the air system.

Another object of my invention is in an air brake system or apparatus to replace a moving piston rod, or the like, actuated by air pressure, by a positively moving bar or arm, this bar or arm actuating a braking system to apply brakes. In such a system the arms or bars are actuated by a cam type of device which is controlled by air pressure acting on a piston.

Another object of my invention is the construction of an air controlled valve and an operating piston, in which the air is passed from one end of the piston to the other by the interengagement of an inner valve mechanism in the valve or the piston with the stationary part of a cylinder; and in this connection with such moving valve or moving piston to have a lateral arm which in one case actuates a release valve and in the case of the piston actuates a cam, there being an air-tight connection preventing leakage at the release valve or the cam.

In constructing my invention I have a cylinder with an air pressure actuated piston connected to a reserve tank, and an oscillating cam is connected by an arm to the piston, the arm extending through a slot in the cylinder, there being an air tight connection at the arm and the cam. This cam actuates the sliding bar or rods which control the application of the brakes.

The piston above described is controlled by a slidable valve in another cylinder. This valve also has an arm extending through the cylinder and connected to a release valve of an oscillating type, giving release to the atmosphere.

My invention in its various aspects may be more readily understood from the following description and drawings, in which:

Figure 1 is a diagrammatic longitudinal section through my air brake apparatus, showing the cam and the mechanism directly connected therewith in elevation, and showing the brakes applied.

Figure 2 is a longitudinal section through the control valve on the line 2—2 of Fig. 1 in the direction of the arrows.

Figure 3 is a transverse section through the control valve and the release valve, on the line 3—3 of Fig. 1 in the direction of the arrows.

Figure 4 is a transverse section through the brake piston and the cam actuated thereby, on the line 4—4 of Fig. 1 taken in the direction of the arrows.

Figure 5 is a longitudinal section through the brake piston on the line 5—5 of Fig. 1 in the direction of the arrows.

Figure 6 is a view similar to Fig. 1 showing the brake in the off position.

Figure 7 is a part section and part elevation showing a modified construction of the brake applying mechanism actuated by a cam.

The control valve indicated by the numeral 11 is constructed substantially as follows, having reference particularly to Figs. 1, 2, 3 and 6:

This comprises a cylinder 12 having heads 13 and 14, the head 13 having an opening with an air pipe 15 connected thereto, this pipe leading to a train system, or the like which may be placed under pressure or under vacuum or released from pressure to atmospheric pressure by control of suitable valves, such as is well known in the art. There is an outlet 16 from the head 14 having a discharge pipe 17 connected thereto leading to a brake piston hereunder described.

A control piston 18 is slidably mounted in the cylinder 12 and has a large bore 19, a smaller bore 20 and a still smaller bore 21 extending inwardly from each end. Plugs 22 are screw-threaded or otherwise secured in the larger bores 19 and have guide bores 24. Mounted in the space between the plugs and the base of the large bore 19 there are valves 25, each having a stem 26 slidable in the small bores 21 and in the guide bores 24. Compression springs 27 normally tend to force these valves into engagement with the plugs and close the air ducts 23 therethrough. The stem connected to the inner piston has an extension 28 preferably with a knob 29 on the end. The piston is also provided with a piston ring 30 at the end 13 adjacent the head of the cylinder. There is also a connecting duct 31 between the large bores 19 at the ends of the piston.

The cylinder is provided at one side with a slot 32 and the piston is also provided with a slot 33 extending therethrough, with nubs 34 projecting inwardly towards each other and a rocking valve arm 35 extends through the slot 32 of the cylinder into the slot 33 of the piston and engages between the nubs 34. This rocking valve arm actuates a release valve.

The release valve designated generally by the numeral 36 is constructed substantially as follows, having reference particularly to Figs. 1, 2, 3 and 6:

A pair of blocks 37 and 38 are bolted together, as indicated at 39, and they are also bolted to the cylinder 12 by bolts 40. These blocks have a recess 41 in which the arm 35 may rock. This arm is journaled on a valve rock shaft 42 journaled in the blocks 38, and on one end of this rock shaft there is a valve disk 43 having a single port 44 therethrough. This port is adapted to register with an air port 45 in the block 38 leading to the recess 41, this recess being sufficiently wide to leave an air space 46 on each side of the arm 35. There are also longitudinal grooves 47 in the piston connecting with the inner end towards the head 14 of the cylinder.

A cup 48 is secured to the block 37, forming an air tight connection. On the rock shaft 42 there is a washer 49 held in place by a pin 50 and a compression spring 51 tensioned between the washer and the block 37. This spring exerts sufficient tension to maintain the valve disk 42 tight against a dressed seat on the block 38, forming a leak-proof connection.

A cup 52 is threaded, or otherwise secured, in an annular socket 53 in the block 38 and has a port 54 extending therethrough. Attached to the outside of the cup there is an adjustable poppet valve, designated generally by the numeral 55, which may be set to release air at any predetermined desired pressure. As this is a known construction it is not herein described.

The brake cylinder and piston, designated generally by the numeral 56, is constructed substantially as follows, having reference particularly to Figs. 1, 4, 5 and 6:

This has a cylinder 57 with a head 58, the head at one end being connected by a pipe 59 with a valve 60 to the discharge pipe 17 from the control valve 11. There is a relief valve 61 also in this head. The other head 62 is provided with an outlet with a pipe 63 leading to a storage reservoir 64 for air under pressure. The cylinder has a slot 65.

The piston 66 has a packing ring 67 at one end, this being the end adjacent the inlet pipe 59. The piston is provided with a large bore 67, an intermediate bore 68 and a small bore 69 at each end, and in each large bore there is a threaded plug 70 having ports 71 therethrough and with a guide bore 72. In each large bore there is a disk valve 73 having an inner stem 74 and an outer stem 75. A spring 76 is normally seated in each of the intermediate bores and presses against each of the valves, thrusting it outwardly. The inner stems are guided in the small bores and in the guide bore 72 of the plug.

The valve stem at the inner end of the piston projects beyond the end of the piston and has a head 77 thereon for a purpose hereunder described. The piston has sufficient clearance 78 or longitudinal grooves similar to the grooves 47 of the valve 11 to permit flow of air back of the piston to the forward part, this being blocked by the piston ring 67. To transfer air from the front to the back of the piston there is a longitudinal duct 79 through the piston. The construction of the valves above mentioned in the piston is substantially the same as the valve construction inside of the control valve.

The piston has a vertical slot 80 extending therethrough, with nubs 81. These nubs engage a rock arm 82 which extends outwardly through the slot 65.

The construction of the control cam and the associated mechanism for applying the brakes is substantially as follows:

A bracket 83 is bolted or otherwise secured to the side of the cylinder 57 having the slot 65, and this bracket has a substantially wedge-shaped recess 84 which registers with the slot 65. A rock shaft 85 is journaled in the bracket and extends through the apex of this recess and has the rock arm 82 keyed or otherwise secured thereto. This rock shaft is also journaled in a journal plate 86 secured to the sides of the bracket.

It is to be understood that the journals through the bracket of the rock shaft 85 are substantially air tight, but in order to afford a tight connection a cup 87 is secured over one end of the rock shaft. The rock shaft is provided with a collar 88 and a spring 89. This spring draws the rock shaft in one direction and presses the cam plate 90 which has a meshed fit against the outside bearings 91 of the bracket. This cam plate has a series of small cam surfaces 92 on its outer edge.

The bracket has an extension plate 93 on which is constructed a slide-way 94 with two slide blocks 95 and a cover plate 96. In this there is a slidably mounted bar 97. This bar at one end engages the cam surface 92 of the cam 90 and the other end acts against one end 98 of a brake lever 99 mounted on a pivot 100 at the extension 93. The other end 101 of this brake lever is connected to any suitable mechanism for actuating a brake, this being indicated as a chain 102 passing over a pulley 103, and through the medium of a spring 104, being attached to a link 105. This operates on the brake shoe arm 106 pivoted to a suitable structure, thereby controlling the brake shoe 107 to bear against the wheel 108.

The manner of operation and control of the air brake apparatus is substantially as follows:

When the brakes are off, the cam is in the position shown in Fig. 6 and the reservoir 63 is charged with air under pressure, in a manner hereunder described. The piston, as will be observed, is adjacent the discharge end of the brake cylinder 57 and the control valve 11 has its piston adjacent the outlet end 16. The release valve 36 is in a closed position with the port 44 of the valve disk 43 and out of registry with the duct or port 45. It will be seen that when the cam is in this position the sliding bar 97 is projected with its end engaging the low part of the cam.

In order to apply the brakes the engineer or operator relieves the air pressure, as in an air line of a train, allowing this to exhaust to the atmosphere, and the first action is to allow a flow of air from the reservoir 64 through the piston 66, in the following manner:

When this piston is in the position shown in Fig. 6 the head 77 of the valve stem engages the head 62 of the cylinder and thrusts the valve disk 73 of the valve at this end inwardly, thus opening the ports 71 and allowing passage of air through the duct 79. This air pressure, together with the action of the spring 76 on the valve at the opposite end of the piston, closes this valve, hence the whole pressure of the air in the reservoir acts on the end of the piston towards the head 62 and forces the piston from the position shown in Fig. 6 to that of Fig. 1. This action rocks the cam 90 from the position shown in Fig. 6 to that shown in Fig. 1 and fully applies the brakes by causing the sliding bar 97 to ride on the cam surface to the highest part of the cam.

The valve stem at the other end of the piston also has a head similar to the head 77 so that when the piston 66 is forced to the other end of its cylinder 57, this head engages the head 58 of the cylinder and opens the valve disk 73 at such end, allowing passage of air through the ports 70 and through the pipes 59 and 17 into the control valve 11.

The first action of the control valve is as follows: When this valve has been forced, as hereunder described, to the position shown in Fig. 6, the head 29 on the valve stem 28 by engaging with the head 14 of the cylinder 12 opens the disk valve 25 at this end from the seat on the plug 22, and allows passage of air through ports 23. The air then passes through the duct 31, together with the spring 20, causing a seating of the valve disk 25 at the other end of the control valve piston. Therefore the force of air acts on the control valve piston and shifts it from the position shown in Fig. 6 to that shown in Fig. 1. This rocking action operates the release valve by rocking the rock valve arm 35 and bringing the port 44 of the valve disk 43 into registry with the duct 45, thereby allowing release of air through the release valve 55 to the atmosphere.

It will be observed that when the control cam for applying the brakes is shifted, on account of the irregularity of the cam surface 92, the slide bar 97 is shifted outwardly a short distance and then rides on the cam without any outward movement. This is followed by a further outward movement, and then another ride without movement. This action causes the brakes to be applied with increasing force and then maintained at such application, followed by a second increasing force and maintenance with this applied force, and as many of these steps of increasing application of the brakes and maintenance of the force as is desired by the construction of the cam surface. When the brakes are once applied, even if only partially applied, it is immaterial whether the air leaks from the reservoir 64 or any part of the mechanism, the brakes will still be maintained in action.

To release the brakes air under pressure is forced through the pipe 15. This air acts first on the control valve, the pressure of the air opening the valve disk 25 at the intake end and allowing passage of air through the passage 31; this disk being seated by the spring 20, prevents further passage of the air and hence the valve is bodily shifted, that is, from the position shown in Fig. 1 to that of Fig. 6, and in such action the release valve 36 is closed. On account of the head 29 of the stem 28 being pressed in by engaging the end 14 of the cylinder 12, air is transmitted completely through the piston 18 and through the pipes 17 and 59 acting on the piston 66. This air blows through the first valve disk 73, but is blocked by the second disk which is seated on the plug 70; therefore the air pressure forces the piston 66 from the position shown in Fig. 1 to that of Fig. 6. Hence, when in this latter position, the valve disk 73 on the end adjacent the head 72 is opened and allows passage of air to the reservoir 64, again building up the pressure in this storage tank, and the cycle may be repeated.

If it is only desired to partly apply the brakes, the air release valve releasing the pressure in the pipe 15 may be opened only for an instant and then closed, which will allow partial movement of the piston 66; but this movement is insufficient to shift the slide bar 97 from the low to the high position.

The construction of Fig. 7 shows a modified arrangement for applying the brakes. In this case the brake piston and cylinder are substantially the same as above described, as is also the rock arm 82. However, the cam 110 is of a somewhat different construction, having a graduated cam surface 111 of varying degrees and a high surface 112. In this construction a bracket substantially the same as element 83 shown in Fig. 4 is used, but the extension 113 is different and has cover plates 114 and 115 with slideways therethrough, in which slide a plurality of push rods 116. On the extension there are also a series of fixed pins 117 which engage a chain 118 attached at one end 119 to a fixed part of the structure. The outer ends 120 of the rods 116 engage this chain and the other end of the chain is secured to a circular part 121 of a brake lever 112 which is mounted on a pintle 123. There is a connection 124 from the lever 112 to a suitable brake mechanism.

The operation and construction of Fig. 7 is substantially as follows:

In the position shown the brake is in the off position, and when the brake-actuating piston is shifted to the other end of its cylinder, the cam 110 is rocked. In such rocking action one rod after the other is pressed outwardly in succession, due to the particular construction of the cam surface, until all of such rods are thrust out. As the outer ends of these rods engage the chain and give it a bend or kink between the pins 117, the chain is in effect shortened, swinging the brake lever from the position shown in full lines in Fig. 7 to the dotted line position, and thus applying the brakes to the wheels of the vehicle. In this construction if the cam is only shifted part way, only one of a few of the rods are pressed outwardly and therefore apply the brakes with a partial pressure. The brakes are released by a reverse action.

It is obvious that detail features of my invention may be considerably changed, but that an essential characteristic is that through the medium of air pressure acting on a positively moving device, the brakes are positively applied and maintained applied, this maintenance being independent of any air leakage which may occur. Moreover, before the brakes are applied, it is immaterial if there is a leakage in the system, so long as there is a sufficient pressure maintained in the storage reservoir 64 to actuate the brake applying piston.

It will be also seen that I have developed a method of braking vehicles, in which the brakes are applied and the application maintained without the maintenance of air pressure or the equivalent.

Various changes may be made in the principles of my invention without departing from the spirit thereof, as set forth in the description, drawings and claims.

I claim:

1. In an air brake, a structure movable by air power, an element having a sliding motion, means to apply brakes due to the movement of said element, and means between the slidable element and the structure movable by air power to slide said element, said means maintaining said element in its moved position independent of the application of air power.

2. In an air brake, a cylinder having a sliding piston controlled by air power, a cam actuated by the piston, and means controlled by the cam to apply brakes, said means maintaining the brakes applied independent of change in the air power.

3. In an air brake, a cylinder having a slidable piston actuated in one direction by air power, a cam operated by the piston, a slidable device actuated by the cam, means connecting said device to a brake to apply same to the said cam maintaining the said device in brake applying position independent of change of the air power moving the piston in the direction stated.

4. In an air brake, a control valve and a brake cylinder each having a sliding piston, said control valve having means to admit air to its piston to move same in one direction, means to store air, means to move the control valve in the other direction by the stored air, said stored air moving the brake piston, means operated by the brake piston to apply brakes, said means maintaining the brakes applied independent of any change in the said stored air.

5. In an air brake, a cylinder having a moving piston, means to move the piston in one direction, means to store air under pressure, means to move the piston in the other direction, due to the pressure of the stored air, means to apply brakes operated from the piston, said means maintaining the brakes applied independent of any change in the pressure of the stored air.

6. In an air brake, a brake cylinder having a brake applying piston therein, means to move the piston in one direction, means to store air under pressure, a cam actuated by the piston when moved by the pressure of the stored air in the opposite direction, means operated by said cam in such movement to apply brakes, said cam maintaining said brakes applied independent of any change in the pressure of the stored air.

7. In an air brake, a control valve having a cylinder and a sliding piston with a passage for air therethrough controlled by valves, an air brake cylinder having a brake piston with a passage for air therethrough controlled by a second set of valves, a storage reservoir connected to the brake piston, a release valve operated by a control valve, means actuated by the brake piston in the brake cylinder to apply brakes by movement of the brake piston, due to the air in the reservoir, said means maintaining the brakes applied independent of any change in the pressure of air in said reservoir.

8. In an air brake as claimed in claim 7, the release valve having a port, said port connecting the side of the brake piston opposite the reservoir connection to the atmosphere, on operation of the control valve in one direction.

9. In an air brake as claimed in claim 7, a sliding bar suitably mounted engaging the said cam, and means operated by the movement of said bar to apply brakes.

10. In an air brake, a cylinder having a brake actuating piston slidable therein, said cylinder having a slot in one side, the piston having a slot with a rock arm engaging therein, said arm being pivotally mounted, a cam connected to the arm, means to actuate the piston in one direction by air pressure, means operated by the cam to apply brakes, said means maintaining the brakes applied independent of the pressure of air moving the piston in the direction stated.

11. In an air brake, a cylinder having a brake applying piston slidable therein, said cylinder having a slot in one side, the piston having a slot, a rock arm extending through said slots, said arm being pivoted on a structure outside of the cylinders, a cam connected to the arm, a slidable bar actuated by the cam, means actuated by said bar to apply brakes, and an air controlling mechanism to move the piston by air pressure in one direction to apply the brakes, said brakes remaining applied independent of any change of the air pressure moving the piston in the said direction.

12. In an air brake as claimed in claim 11, the cam having a cam surface with a series of rises and surfaces concentric to the pivot to allow applying a brake in successive increasing pressures with an interval between such increasing pressures.

13. In an air brake, a cylinder having a brake actuated piston slidable therein, said cylinder having a slot in one side, the piston having a slot, a rock arm engaging in the slot of the piston and extending outwardly through the slot in the cylinder, a bracket secured to the cylinder having a rock shaft connected to the rock arm, a cam attached to the rock shaft, a slidable bar actuated by the cam, a cover over one end of the rock shaft, a spring on the rock shaft engaging the bracket, said spring pulling the shaft and cam into engagement with the bracket, forming a substantially leak-tight connection, and means to actuate the piston by air pressure to move the cam, and means actuated by the bar to apply brakes.

14. In an air brake, a brake cylinder having a brake applying piston, a cam actuated by said piston, a plurality of slidable rods engaged by the cam, a chain secured in a fixed structure and engaging over a series of fixed devices, the said rods engaging the chain between the said devices, a brake applying mechanism connected to the chain, the movement of the piston operating the cam and sliding said rods to actuate the chain to apply the brake mechanism.

In testimony whereof I have signed my name to this specification.

CRUTHERS I. FRANTZ.